United States Patent Office 3,217,324
Patented Nov. 9, 1965

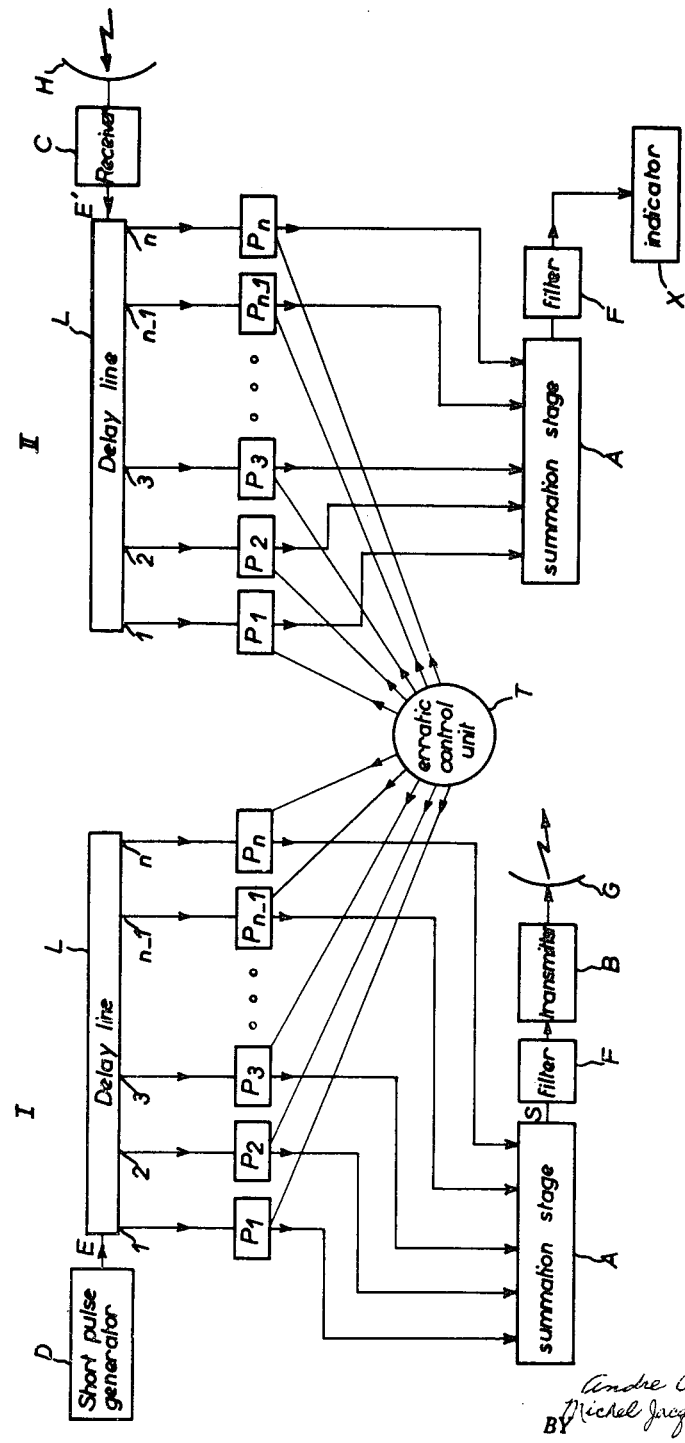
Fig.: 2

3,217,324
SIGNAL GENERATING AND PROCESSING DEVICE AND APPLICATION THEREOF TO LONG-RANGE RADARS
André Adamsbaum, Boulogne-Billancourt, and Michel Jacques Robert Nicolas, Paris, France, assignors to Societe Nationale d'Etude et de Construction de Moteurs d'Aviation, Paris-Seine, France, a company of France
Filed Dec. 19, 1961, Ser. No. 160,467
Claims priority, application France, Dec. 30, 1960, 848,525
6 Claims. (Cl. 343—17.1)

At present two wide classes of methods are known for obtaining and using signals of which the product of the bandwidth multiplied by the duration of the signal is a large number, a highly desirable feature in radar installations:

(1) The so-called method of correlation, in which the signal actually received (and afflicted with all the vicissitudes of transmission) is compared to some suitably time-located signal representing whatever it is desired to receive (in the case of a radar system, this will be the transmitted signal). For all practical purposes, this comparison is a correlating operation, i.e. multiplication of the signal received by its suitably delayed replica, and integration of the product.

This system lends itself particularly well to radar detection systems that transmit a random signal, i.e. a signal the characteristics of which may be unpredictably modified. Indeed, the very considerable advantage of this system is that it makes any attempt at effective jamming difficult, owing to the uncertainty of the jamming system operators as to the characteristics of the signals to be jammed, due precisely to their random nature. On the other hand, the system has a serious drawback in that it resorts to a large number of correlators and integrators, which singularly complicates the circuitry and increases overall size out of all proportion.

(2) The so-called pulse compression method, in which the signal, generated for example by means of a filter, is decoded by a filter matched to the transmitted signal. The term "filter matched to a signal" will be taken hereafter as meaning a filter giving, in response to an extremely short pulse, a signal which is identical except for an inversion or change of sign and a time-shift. In other words, the matched filter, on receiving a very short input signal, will give an output signal identical to said input but inverted and shifted along the time-axis.

The advantage of the latter system over the former is that it enables all the possible delays to be investigated without recourse to a large number of correlators and integrators. This advantage, however, must be weighed against the fact that transmission of a coded signal that is always identical, or of a small number of signals, even if chosen at random, exposes the channel used to a form of jamming that would be based on those very signals and would therefore be particularly effective.

It is the object of the present invention to provide a form of electronic circuitry, whereby the advantage of the first method, resulting from the use of difficult-to-jam random signals, is combined with the advantage of the second method, which stems from its very simplicity of design and execution.

A circuitry according to the invention basically comprises a pulse compression filter or matched filters adapted to generate and continuously decode signals made random by the slaving of component parts of the filtering device to an erratically operating control means.

In the accompanying drawings:

FIGURE 2 shows diagrammatically an alternative form of circuitry.

Figure 1:
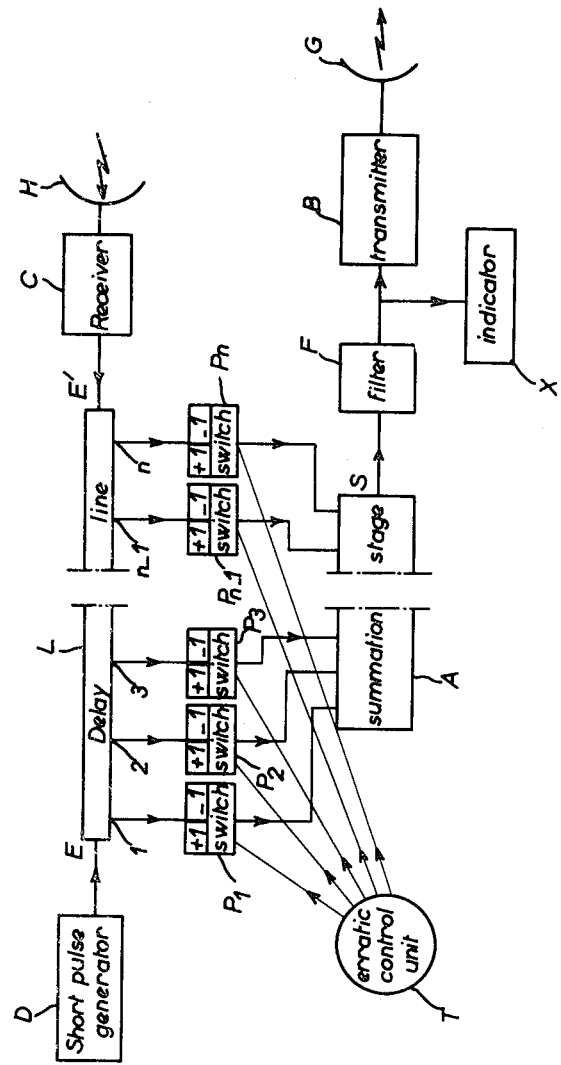
FIGURE 1 is a block diagram of a circuitry executed in accordance with the invention.

A circuitry according to the invention utilizes a filtering device of the type which basically comprises a delay line L provided with spaced taps 1, 2, 3 . . . $n$ electrically separated by equal time intervals. To these taps are connected branch lines comprising units P1, P2 . . . P$n$ which symbolize the application of transmission coefficients that are equal in absolute magnitude but have plus or minus signs assigned to them. This transmission coefficient may in fact be equal to $\pm 1$, that is to say that the branch lines transmit the voltages taken from the corresponding points 1, 2 . . . $n$ on the line L, either without modification or by simply inverting them. These voltages processed thus are applied to a summation stage A which furnishes a signal proportional to the algebraic sum of said voltages (cf. "Electronic Analog Computers," G. A. Korn and T.M. Korn, McGraw-Hill Book Co., 1956, pages 13–15).

The input voltage to the filtering device is applied to one or the other of the extremities E or E' of delay line L, the output voltage being collected at S, past the summation stage A.

If a very short pulse from a generator D be applied to the input E of the filter device, the output S will provide a signal the duration of which will be close to the delay provided by the line L between the taps 1 and $n$.

This signal will be sinusoidal, phase-modulated, and of constant level, and its phase will be inverted as many times as changes of sign occur in the succession of P$n$ transmissions at the precise instants corresponding to those changes.

This signal is applied to a filter F whose response to a very short pulse is a sinusoidal signal which is modulated by a substantially rectangular envelope and whose duration is equal to the time interval separating the taps on the delay line.

The example illustrated in the block diagram refers to a radar installation, and B denotes thereon a transmitter apparatus well known per se adapted to change the frequency of the signal and raise its power level for subsequent transmission over the antenna G. Similarly, the receiving antenna H is followed by a known receiver apparatus C, similar to B, which also changes the frequency of the received signal and raises its power level before applying it to the second input E' of the filtering device.

Since the signal obtained at that point has the output signal S for origin, and since the P$n$ transmissions are the same as before, there is provided between E' and S a filter matched to the signal existing at S after the first operation (cf. "An Introduction to Matched Filters," George L. Turin, IRE Transactions on Information Theory, June 1960, page 324).

It is manifest that if use is made, for the second operation, of a second filter identical to that shown on FIGURE 1, rather than a single such filter, what has been stated precedingly will hold true. FIGURE 2 shows an example of circuitry having two identical filters: one filter designated generally by I on the transmission portion of the radar circuitry and the other filter designated generally by II on the reception portion thereof (cf. cited publication, FIGS. 13 and 14). The object of the present invention is, while retaining the normal operation of the circuitry, to change the sequence of the P$n$ transmissions, provided that the sequence adopted is the same at each of the two passages of the signal.

Application of the present invention to the system hereinbefore described consists precisely in making the sequence of the P$n$ transmissions random one.

To this end, the filtering device described precedingly is combined with an erratically operating control unit, or with a random selection device T providing either of two equiprobable contingencies. This device T is associated to each P$n$ transmission and determines the sign thereof.

Such a radar installation operates as follows:

A random selection is made of a certain P$n$ combination to be maintained throughout subsequent operations. To the input E of the filtering device is applied a very short pulse, and from the output S thereof is collected a signal of constant amplitude which is phase-modulated in $\pi$ quanta, according to the P$n$ sequence. This signal is transmitted by the antenna G after a frequency translation and an amplification by transmitter B, and after reflection by a target is received by the antenna H and undergoes inverse frequency translations and suitable amplification in receiver C. The signal is then applied to the filtering device input E' and collected at S after decoding by said filtering device, the latter behaving as a matched filter in respect of the signal.

There are thereby obtained at S signals which are very similar to those that would be produced by a conventional radar (cf. cited publication, pages 312–324), and these signals are put to profit in any convenient indicator device X, well known per se.

After the echoes from all the targets in the region to be explored have been received, a fresh combination of P$n$ is chosen at random and the process repeated. This random selection may be ensured, for example, by cosmic ray detectors, or by sound-level indicating instruments having an operating threshold that corresponds roughly to an average value of the physical quantities to be detected.

In practice, the realization of two-way-determinable transfer functions P$n$ raises no acute problems. A symmetrical delay line and electromagnetic relays may be used, for example.

What we claim is:

1. A radar having a transmitter and receiver pulse processing circuitry, comprising, in said circuitry, a pulse compression filter device having constituent elements with selectively variable characteristics, an erratically-operating device adapted to produce control signals in a practically unpredictable manner, and interconnecting means between said constituent elements and said erratically-operating device for bringing the characteristics selection of said elements under the control of said signals.

2. A circuitry as claimed in claim 1, wherein the pulse compression filter device is of the type comprising a delay line, a plurality of regularly spaced taps therealong, a summation stage having as many input ends as there are taps and an output end at which is collected a signal proportional to the algebraic sum of any voltages applied to said input ends, and separate branch lines extending respectively between said taps and said input ends.

3. A circuitry as claimed in claim 2, wherein the constituent elements with selectively variable characteristics of the pulse compression filter device are said branch lines.

4. A circuitry as claimed in claim 3, wherein the selectively variable characteristics of the branch lines are the transmission coefficient thereof.

5. A circuitry as claimed in claim 4, wherein the transmission coefficient of the branch lines has two selective values, one positive and the other negative, equal in absolute magnitude.

6. A circuitry as claimed in claim 5, wherein the selective values of the transmission coefficient of the branch lines are $+1$ and $-1$.

References Cited by the Examiner

UNITED STATES PATENTS

| | | | |
|---|---|---|---|
| 2,406,978 | 9/48 | Wendt et al. | 328—119 |
| 2,752,507 | 6/56 | Dureau | 328—119 |
| 2,989,743 | 6/61 | Varela | 343—17.1 |
| 3,016,519 | 1/62 | Linder | 343—100.7 |
| 3,046,545 | 7/62 | Westerfield | 343—17.1 |
| 3,050,726 | 8/62 | Laurent | 343—17.1 |

CHESTER L. JUSTUS, *Primary Examiner.*

HERMAN K. SAALBACH, *Examiner.*